United States Patent [19]

Sakaguchi et al.

[11] Patent Number: 4,840,092
[45] Date of Patent: Jun. 20, 1989

[54] HYDRAULIC CONTROL DEVICE FOR AUTOMATIC TRANSMISSIONS

[75] Inventors: Yoshikazu Sakaguchi, Anjo; Yutaka Taga, Aichi; Yuji Kashihara, Toyota, all of Japan

[73] Assignees: Aisin-Warner Kabushiki Kaisha; Toyota Jidosha Kabushiki Kaisha, both of Aichi, Japan

[21] Appl. No.: 67,764

[22] Filed: Jun. 25, 1987

[30] Foreign Application Priority Data

Jun. 30, 1986 [JP] Japan ................... 61-154834
Jun. 30, 1986 [JP] Japan ................... 61-154835

[51] Int. Cl.⁴ .......................................... B60K 41/06
[52] U.S. Cl. ..................................... 74/869; 74/866
[58] Field of Search ............... 74/866, 867, 877, 868, 74/869; 192/13 A, 0.076, 109 F

[56] References Cited

U.S. PATENT DOCUMENTS

| | | | |
|---|---|---|---|
| 4,476,745 | 10/1984 | Moan | 74/866 |
| 4,603,604 | 8/1986 | Nishikawa et al. | 74/869 |
| 4,625,589 | 12/1986 | Nishikawa et al. | 74/867 X |
| 4,648,289 | 3/1987 | Kubo et al. | 74/866 |
| 4,660,442 | 4/1987 | Nishikawa et al. | 74/869 |
| 4,686,872 | 8/1987 | Aoki et al. | 74/869 |
| 4,697,474 | 10/1987 | Sumiya et al. | 192/0.076 X |
| 4,709,792 | 12/1987 | Sakai et al. | 192/109 F X |
| 4,718,525 | 1/1988 | Yamaguchi | 192/109 F X |
| 4,727,774 | 3/1988 | Sumiya et al. | 74/868 X |
| 4,730,708 | 3/1988 | Hamano et al. | 192/0.076 X |

FOREIGN PATENT DOCUMENTS 59-187141 10/1984 Japan ..................... 74/867
2147065 5/1985 United Kingdom .......... 74/866

Primary Examiner—Dwight G. Diehl
Attorney, Agent, or Firm—Frank J. Jordan; C. Bruce Hamburg; Manabu Kanesaka

[57] ABSTRACT

A selecting valve is provided, which is switched by different signals sent out when the vehicle is stopped or when the vehicle is to start to move. The selecting valve is connected to a hydraulic servo unit for a forward clutch which is engaged to transmit torque when the vehicle is to move forward, and is supplied with line pressure and a control pressure provided by an electronically operated regulating valve, such as an electronically controlled throttle valve. The regulated control pressure from the electronically operated regulating valve is supplied to the hydraulic servo unit for the forward clutch when the vehicle is stopped, while line pressure is supplied when the vehicle is to move, thus preventing creeping and shift shock at starts. Since the selecting valve is provided with a port leading to the hydraulic servo unit for a brake which restricts vehicle movement, the brake can be applied when the vehicle is stopped and released when moved, thus providing hill-holding capability.

15 Claims, 8 Drawing Sheets

FIG. 4

| position | | solenoid valve | | | | | clutch | | | brake | | | | OWC | | |
|---|---|---|---|---|---|---|---|---|---|---|---|---|---|---|---|---|
| | | S1 | S2 | S3 | SL | SD | C0 | C1 | C2 | B0 | B1 | B2 | B3 | F0 | F1 | F2 |
| P | | × | ○ | × | × | × | ○ | × | × | × | × | × | × | × | × | × |
| R | | × | ○ | × | × | × | ○ | × | ○ | × | × | × | ○ | ○ | × | × |
| N | | × | ○ | × | × | × | ○ | × | × | × | × | × | × | × | × | × |
| D | 1st | × | ○ | × | × | × | ○ | ○ | × | × | × | × | × | ○ | × | ⊗ |
| | 2nd | × | ○ | ○ | ◎ | ※ | ○ | ○ | × | ○ | × | × | × | × | × | ⊗ |
| | 3rd | ○ | ○ | × | ◎ | ※ | ○ | ○ | × | × | ○ | × | × | ○ | ⊗ | × |
| | 4th | ○ | ○ | ○ | ◎ | × | ○ | ○ | × | ○ | ○ | × | × | × | ⊗ | × |
| | 5th | ○ | × | × | ◎ | × | ○ | ○ | ○ | × | × | ○ | × | ○ | × | × |
| | 6th | ○ | × | ○ | ◎ | × | × | ○ | ○ | ○ | × | ○ | × | × | × | × |
| | (5th) | × | × | × | × | × | ○ | ○ | ○ | × | × | ○ | × | ○ | × | × |
| S | 1st | × | ○ | × | × | × | ○ | ○ | × | × | × | × | × | ○ | × | ⊗ |
| | 2nd | × | ○ | ○ | ◎ | ※ | ○ | ○ | × | ○ | × | × | × | × | × | ⊗ |
| | 3rd | ○ | ○ | × | ◎ | ※ | ○ | ○ | × | × | ○ | ○ | × | ○ | ○ | × |
| | 4th | ○ | ○ | ○ | ◎ | × | ○ | ○ | × | ○ | ○ | ○ | × | × | ○ | × |
| | 5th | ○ | × | × | ◎ | × | ○ | ○ | ○ | × | × | ○ | × | ○ | × | × |
| | 6th | ○ | × | ○ | ◎ | × | ○ | ○ | ○ | ○ | × | ○ | × | × | × | × |
| | (5th) | × | × | × | × | × | ○ | ○ | ○ | × | × | ○ | × | ○ | × | × |
| L | 1st | × | ○ | × | × | × | ○ | ○ | × | × | × | × | ○ | ○ | × | ○ |
| | 2nd | × | ○ | ○ | ◎ | ※ | ○ | ○ | × | ○ | × | × | × | × | × | ○ |
| | 3rd | ○ | ○ | × | ◎ | ※ | ○ | ○ | × | × | ○ | ○ | × | ○ | ○ | × |
| | 4th | ○ | ○ | ○ | ◎ | × | ○ | ○ | × | ○ | ○ | ○ | × | × | ○ | × |
| | (1st) | × | × | × | × | × | ○ | ○ | × | × | × | × | ○ | ○ | × | ○ |

| note | | | | |
|---|---|---|---|---|
| | ○ | ON | engaged | locked |
| | × | OFF | released | free |
| | ◎ | ON L-UP ON / OFF L-UP OFF | — | — |
| | ⊗ | — | — | free when coasting |
| | ※ | actuated when shifting 2→3 | | |

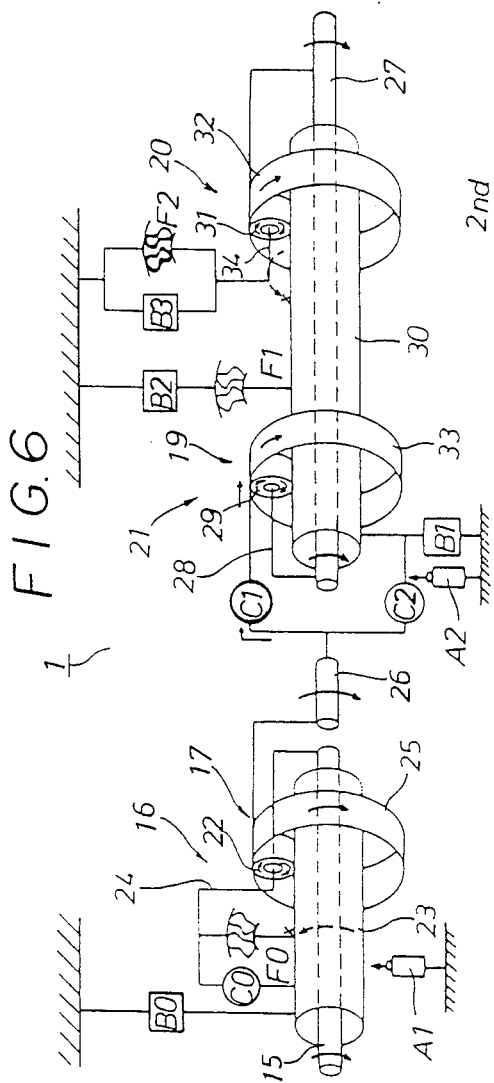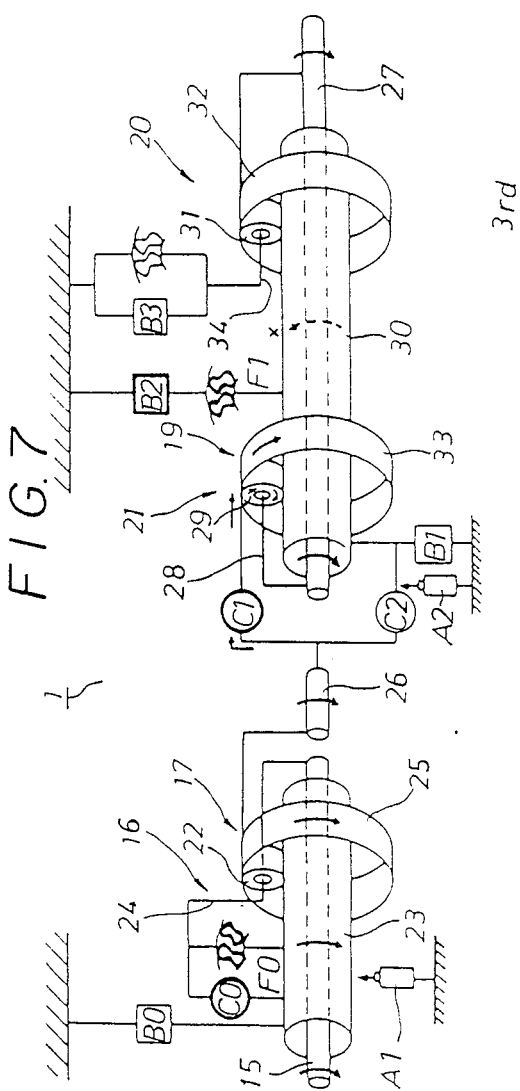

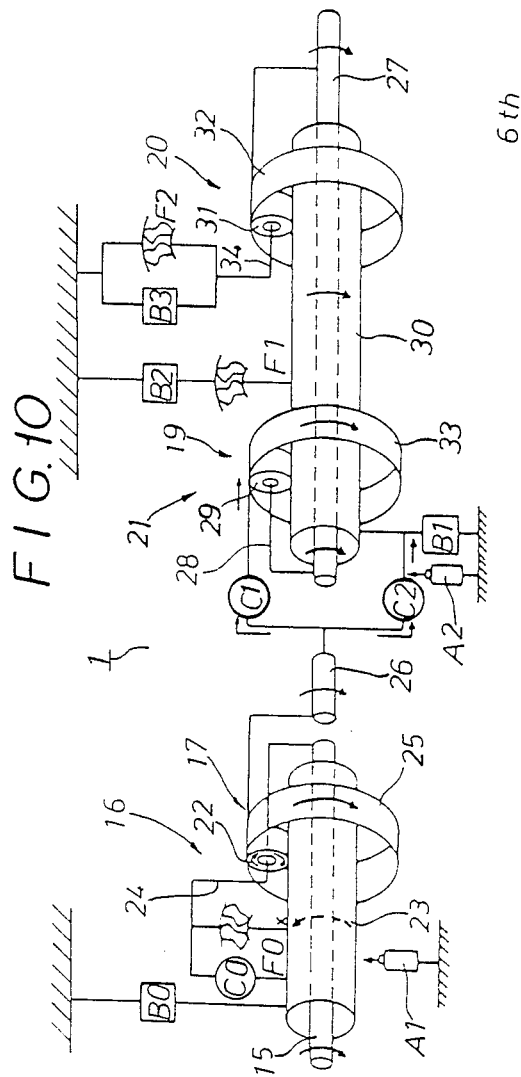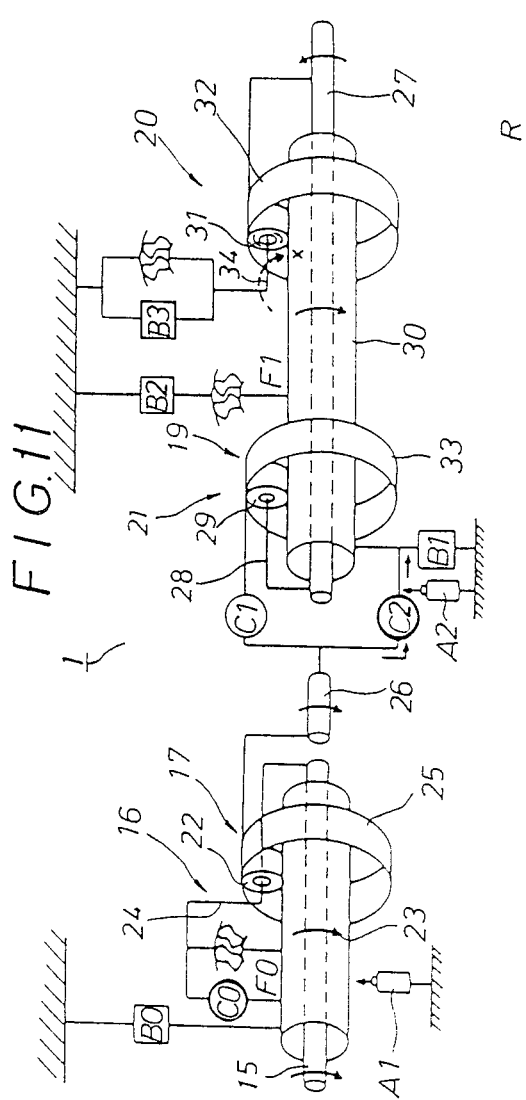

HYDRAULIC CONTROL DEVICE FOR AUTOMATIC TRANSMISSIONS

BACKGROUND OF THE INVENTION

1. Field of the Invention

The present invention relates to a hydraulic control circuit for automatic transmissions mounted on motor vehicles, particularly to a control circuit suitable for use in multiple speed automatic transmissions by which multiple speeds such as six forward speeds are obtained by combining a sub-transmission unit such as an overdrive mechanism with a main transmission unit such as a three speed transmission mechanism, and more specifically to a hydraulic control device for electronically controlled automatic transmissions equipped with electronically operated regulating valves such as electronically controlled throttle valves.

2. Description of the Prior Art

Automatic transmission in general demonstrate what is commonly known as creeping when a vehicle with the automatic transmission is stopped in D range, where the vehicle tends to move in a forward direction due to the tractive torque delivered by the torque converter. For this reason, a driver of the vehicle must continuously apply pressure on the brake pedal to maintain the vehicle at standstill, which not only increases driver's fatigue, but also increases fuel consumption by subjecting the engine to extra load.

A control device has therefore been proposed previously, wherein the transmission is automatically shifted up to a higher range when the vehicle is stopped, to prevent creeping by the smaller torque transmitted in higher range.

Another device has also been proposed, wherein creeping is prevented by disconnecting the forward clutch when the vehicle is stopped, so that no torque is transmitted to the wheels.

However, while the abovementioned example which shifts up to a higher range is capable of preventing creeping in normal idling condition, creeping still occurs while idling at higher engine revolutions during engine warm-up. Also, improvement in fuel conomy cannot be expected since the engine is still under load.

With the abovementioned example in which the forward clutch is disconnected, in order to avoid shift shock while reconnecting the clutch when starting, special equipments such as accumulators, modulator valves and solenoid valves are required, which results in the complexity and bulk of the unit, and also leads to cost increases and problems in reliability.

Further, with the forward clutch disconnected, the vehicle is liable to start rolling even on slight grades, as the vehicle is no longer restrained from movement. It is therefore desirable for such anti-creep devices to incorporate a hill-holding mechanism for preventing the vehicle from rolling on grades, but the addition of brake and selecting valve necessary for hill-holding leads even more to complexity of the device.

SUMMARY OF THE INVENTION

The primary objective of the present invention is to prevent creeping and to reduce shift shock when starting, while maintaining simple construction, by applying a predetermined pressure on a hydraulic servo for a forward clutch while the vehicle is during stopping, with the use of an electronically operated regulating valve such as an electronically controlled throttle valve.

Another objective of the present invention is to provide hill-holding capability without adding to complexity of the device.

The present invention has been made in view of the above circumstances, and is characterised by the provision of a selecting valve which is operated by signals sent out while the vehicle is at standstill or in motion, and connected to a hydraulic servo unit for a forward clutch which engages to transmit torque when the vehicle is to move in a forward direction. The selecting valve is supplied with line pressure through a port which is connected to line pressure when a manually operated selector valve is in a forward position, and with a control pressure (for example throttle pressure) provided by an electronically operated regulating valve such as an electronically controlled throttle valve to a value just before causing the clutch to engage, to selectively supply the hydraulic servo unit for the forward clutch with the control pressure (throttle pressure) when the vehicle is stopped, and with line pressure when the vehicle is to move.

Further, by connecting the selecting valve to the hydraulic servo unit for a brake which restrains the vehicle from rolling, in addition to the hydraulic servo unit for the forward clutch which engages to transmit torque when the vehicle is to move forward, the control pressure regulated by the electronically operated regulating valve is fed to the hydraulic servo unit for the forward clutch and line pressure is fed to the hydraulic servo unit for the brake to apply the brake when the vehicle is stopped, while line pressure is fed to the hydraulic servo unit for the forward clutch and pressure is removed from the hydraulic servo unit for the brake to release the brake when the vehicle is to move.

Under the above arrangement, when the vehicle comes to a stop with the manually operated selector valve in D range (or S or L range), the selecting valve is switched to connect a port leading to the hydraulic servo unit for the forward clutch to a port leading to control pressure (throttle pressure) instead of the port leading to line pressure. An electronically operated regulating valve (throttle valve) then regulates the control pressure (throttle pressure) with a linear solenoid controlled by signals supplied by a control unit, to a valve just before engaging the forward clutch and transmitting torque, and applies such control pressure to the hydraulic servo unit for the forward clutch. Under this condition, the forward clutch is still disengaged so that creeping is avoided. When the selecting valve is switched by signals received when the vehicle is to move, the port leading to the hydraulic servo unit for the forward clutch is connected to the line pressure port. The forward clutch is then subjected to line pressure from a condition just before engaging, and is thus swiftly engaged so that the vehicle would start moving.

Also, by connecting the line pressure port to the hydraulic servo unit for the brake at the same time when the control pressure port is connected to the hydraulic servo unit for the forward clutch, line pressure is fed to the hydraulic servo unit for the brake while control pressure is fed to the hydraulic servo unit for the forward clutch. Under such condition, the forward clutch is disengaged so as not to transmit torque, while the brake is applied to prevent the vehicle from rolling backwards, thus preventing the occurrence of creep and providing hill-holding. When the selecting valve is switched by signals received when the vehicle is in motion, the line pressure port is connected to the hydraulic servo unit for the forward clutch, and the hydraulic servo unit for the brake is connected to a drain port. Then, the forward clutch is subjected to line pressure from a condition just before engaging, and is thus smoothly and swiftly engaged, while the brake is released to enable the vehicle to start moving.

The above and other objects, features and advantages of the present invention will become apparent from the following descriptions and appended claims, taken in conjunction with the accompanying drawings which show by way of example some illustrative embodiments of the invention.

BRIEF DESCRIPTION OF THE DRAWINGS

FIG. 4 is a table showing the state of each functional element of the device in each speed.

FIGS. 5 through 11 show operation of the automatic transmission in each speed.

DESCRIPTION OF THE PREFERRED EMBODIMENT

An embodiment of the present invention shall now be described with reference to the figures.

Figure 2:
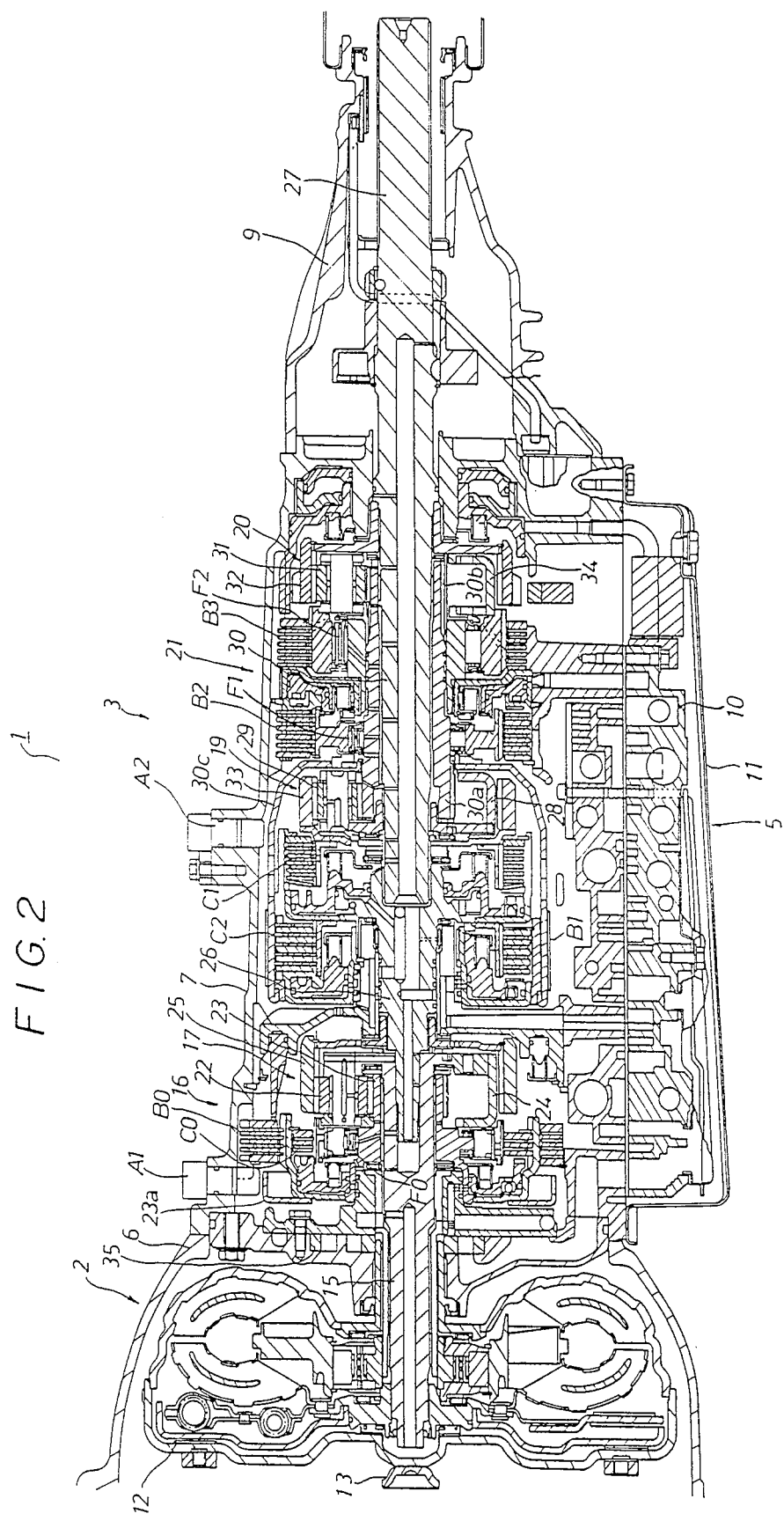
FIG. 2 is an overall cross sectional view of an automatic transmission to which the present invention is applied.

As illustrated in FIG. 2, the multiple speed automatic transmission 1 comprises a torque converter 2, a planetary shift gear mechanism 3 and a hydraulic control unit 5, each contained within a converter housing 6, transmission case 7 and extension housing 9, and valve body 10 and oil sump 11. The torque converter 2 is equipped with a lock-up clutch, and transmits rotation of input member 13 to an input shaft of the shift gear mechanism 3 through fluid flow in the torque converter 2 or directly through the lock-up clutch. The shift gear mechanism 3 includes a sub-transmission unit 16 comprising an overdrive (O/D) planetary gear unit 17, and a main transmission unit 21 in turn comprising a front planetary gear unit 19 and a rear planetary gear unit 20.

The overdrive planetary gear unit 17 comprises a carrier 24 affixed to the input shaft 15 and supporting planetary gears 22, a sun gear 23 rotatably fitted over the input shaft 15 and a ring gear 24 affixed to the input shaft 26 of the main transmission unit 21. An overdrive direct clutch $C_0$ and one-way $F_0$ link the carrier 24 to sun gear 23, while an overdrive brake $B_0$ is provided in between the sun gear 23 and transmission case 7.

The front planetary gear unit 19 comprises a carrier 28 affixed to the output shaft 27 and supporting planetary gears 29, a sun gear $30a$ rotatably fitted over the output shaft 27 and integrated with the sun gear $30b$ of the rear planetary gear unit, and a ring gear 33 connected to the input shaft 26 through a forward clutch $C_1$. A direct clutch $C_2$ links the input shaft 26 to sun gear 30, while between the sun gear 30 and transmission case 7 are provided, a second coast brake $B_1$ and a second brake $B_2$ with a one-way clutch $F_1$ in series.

The rear planetary gear unit 20 comprises a carrier 34 supporting planetary gears 31, sun gear $30b$ and a ring gear 32 affixed to the output shaft 27. A first speed and reverse brake $B_3$ and a one-way clutch $F_2$ are provided in parallel between the carrier 34 and transmission case 7. 35 indicates the oil pump in FIG. 2.

A revolution sensor $A_1$ comprising a photoelectric sensor or an electromagnetic sensor is provided on the transmission case 7 over the overdrive planetary gear unit 17, while on the flange $23a$ of the sun gear 23 are provided notches or holes evenly spaced around the periphery. Hence, the revolution sensor $A_1$ detects the rotational speed of sun gear 23, or the shift operating condition of the sub-transmission unit 16.

Another revolution sensor $A_2$ is provided on the transmission case 7 over the front planetary gear unit 19, with notches or holes provided on a clutch element $30c$ extending from sun gear 30. The revolution sensor $A_2$ hence detects the rotational speed of sun gear 30, or the shift operating condition of the main transmission unit 21.

Figure 3:
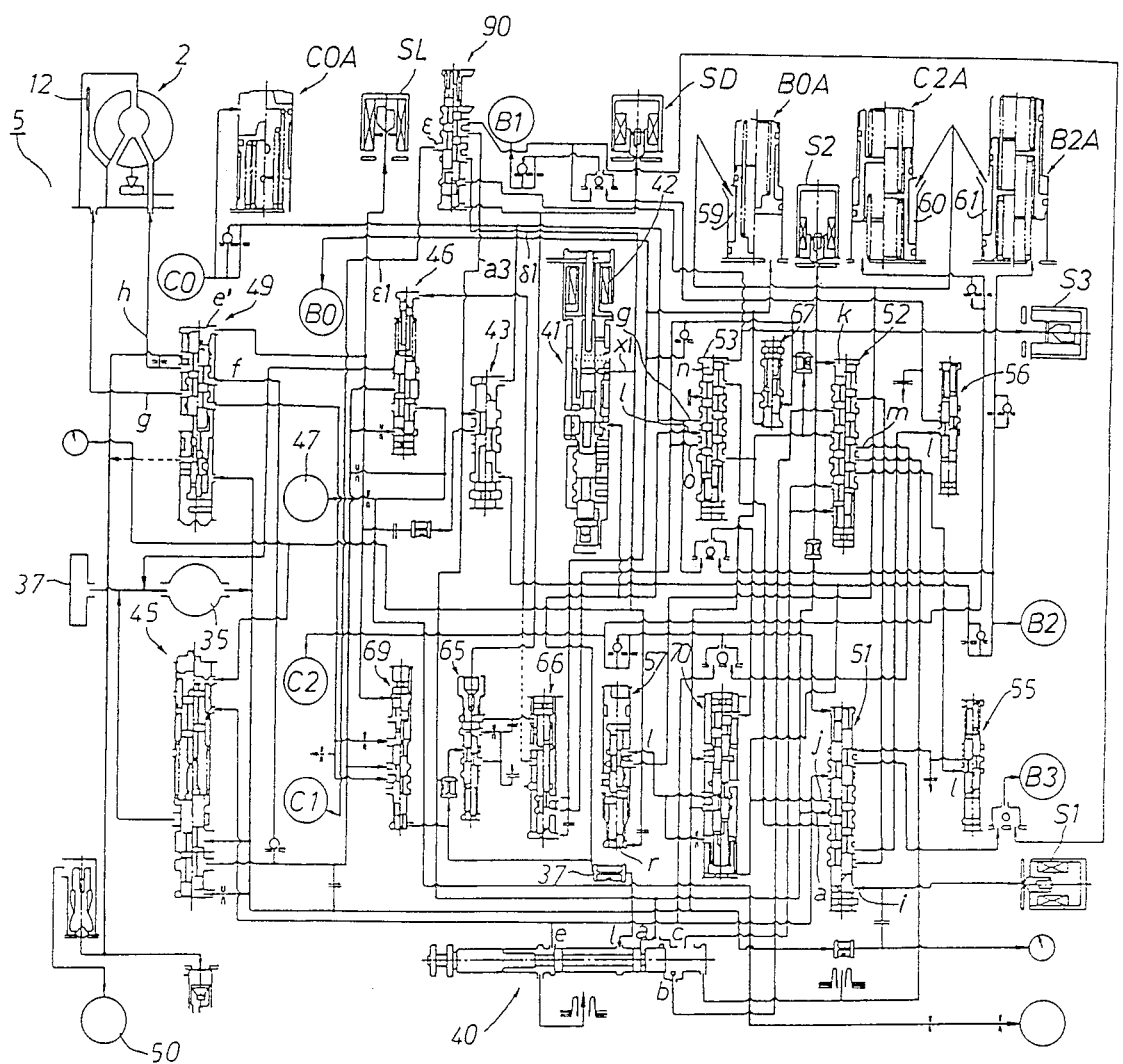
FIG. 3 is an overall schematic view of the hydraulic control device for the automatic transmission of FIG. 2.

Meanwhile, as illustrated in FIG. 3, the hydraulic transmission control system 5 includes numerous valve with accumulators, orifice 36 and strainer 37. Descriptions will now be made below on each of the valves.

Figure 1:
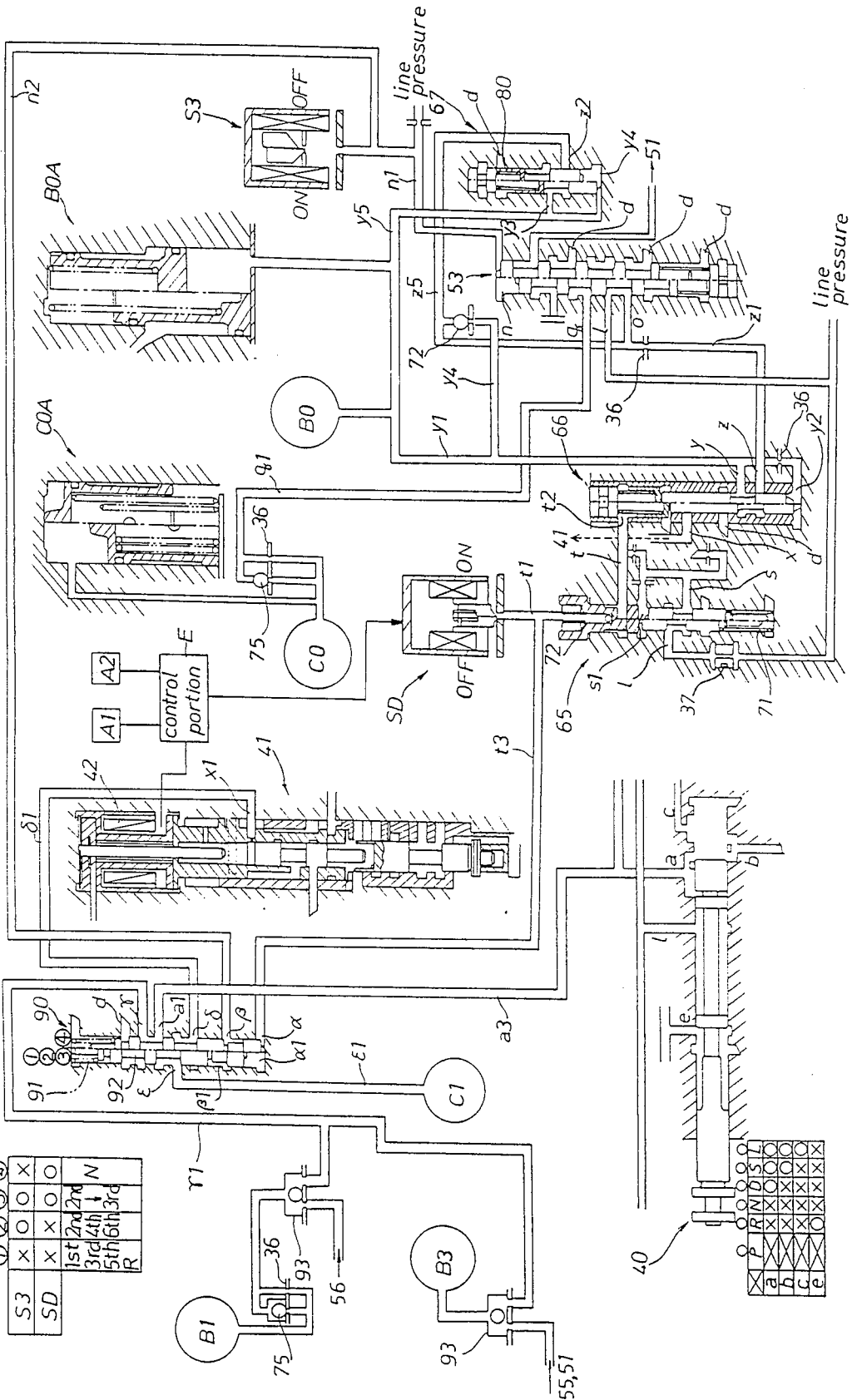
FIG. 1 is a schematic view of an embodiment of the present invention applied to a multiple speed transmission comprising a main transmission unit and a sub-transmission unit.

The manually operated selector valve 40 is shifted among P, R, D, S and L ranges by a shift lever, selectively opening oil channels a, b, c and e as illustrated in FIG. 1, while line pressure is applied to channel 1.

The primary regulator valve 45 is regulated by throttle pressure, and provides a line pressure corresponding to the load. More specifically, the line pressure is increased under heavy loads to secure sufficient operating pressure for clutches C and brakes B, and adjusted to lower value under lighter loads.

The second regulator valve 46 is regulated by hydraulic pressure provided by the primary regulator valve 45, and controls converter pressure supplied to the torque converter 2 and lubrication pressure supplied to the lubrication system 47.

The lock-up relay valve 49 is controlled by solenoid valve $S_L$, and switches oil flow between the lock-up clutch 12 and oil cooler 50. More specifically, line pressure is supplied to the top chamber e' when solenoid valve $S_L$ is energized, disconnecting channel f for the converter pressure regulated by the second regulator valve 46 from the lock-up clutch OFF channel g and connecting it instead to the ON channel h, while connecting the OFF channel g to the drain circuit.

The first shift valve 51 shift the main transmission unit 21 between first and second speeds (or first and third speeds for the transmission as a whole), and is operated by solenoid valve $S_1$. More specifically, line pressure is apllied to chamber i when solenoid valve $S_1$ is deenergized, shutting off line pressure channel a of the manually operated valve 40 in D, S and L ranges, and connecting channel a to channel j when solenoid valve $S_1$ is energized, to supply line pressure to brake $B_2$ and its associated accumulator $B_2$ A.

The second shift valve 52 shifts the main transmission unit 21 between second and third speeds (or third and fifth speeds for the transmission as a whole), and is operated by solenoid valve $S_2$. More specifically, line pressure is applied to chamber k when solenoid valve $S_2$ is deenergized, supplying line pressure to the direct clutch $C_2$ and its associated accumulator $C_2$ A by connecting the line pressure channel l with channel m, and shutting them off when solenoid valve $S_2$ is energized.

The third shift valve 53 shifts the sub-transmission unit 16, and is operated by solenoid valve $S_3$. More specifically, line pressure is applied to chamber n when solenoid valve $S_3$ is energized, to connect line pressure channel 1 with channel o, supplying line pressure to the overdrive brake $B_0$ and its associated accumulator $B_0 A$ through the $B_0$ release control valve 66 which shall be described later, while line pressure channel 1 is connected to channel q when solenoid valve $S_3$ is deenergized, supplying line pressure to the overdrive direct clutch $C_0$ and its associated accumulator $C_0 A$.

The first coast modulator valve 55, with the manually operated selector valve 40 in L range, regulates the line pressure in channel 1 supplied from port c through the second shift valve 52 to coast modulator pressure, and supplies the coast modulator pressure to the first speed and reverse brake $B_3$ through the first shift valve 51.

The second coast modulator valve 56, with the manually operated selector valve 40 in S range, regulates the line pressure in channel 1 supplied from port b through the second shift valve 52 and the first shift valve 51 to coast modulator pressure, and supplies the coast modulator pressure to the second coast brake $B_1$.

The first accumulator control valve 57, by applying the throttle pressure to chamber r, regulates the hydraulic pressure supplied through the second accumulator control valve 70 described later, to accumulator control pressure, and supplies the accumulator control pressure to the back pressure chambers in accumulators $B_0 A$, $C_2 A$ and $B_2 A$ for the overdrive brake $B_0$, direct clutch $C_2$ and second brake $B_2$.

In addition to the hydraulic devices described above, the present hydraulic transmission control system 5 includes a throttle valve 41, a cutback valve 53, an $S_D$ modulator valve 65, a $B_0$ release control valve 66a $B_0$ sequence valve 67, a lock-up control valve 69 and a second accumulator control valve 70, together with the selecting valve 90 characterizing the present invention.

As illustrated in FIG. 1, line pressure is supplied to the $S_D$ modulator valve 65 from line pressure port 1 through oil strainer 37, and to the top chamber $s_1$ through channel s, and balanced with the feedback pressure acting on chamber $s_1$ and spring 71 to be regulated to a predetermined pressure (for example, 4 kg/cm$^2$), the regulated solenoid modulator pressure being supplied to channel t.

Channel t is connected to solenoid valve $S_D$ through plug 72 and channel $t_1$, and to $B_0$ release contro valve 66. The control pressure obtained by on-off control or by duty control of solenoid valve $S_D$ is fed to chamber $t_2$ to control the control valve 66.

Whereas solenoid valve $S_D$ is controlled by signals from control unit E based on outputs from revolution sensors $A_1$ and $A_2$, if valve $S_D$ is subjected to on-off control, a brake release pressure corresponding to throttle setting is obtained by applying throttle pressure on port x.

Port y of the $B_0$ release control valve 66 is connected to the overdrive brake $B_0$ and its associated accumulator $B_0 A$ through channel $y_1$, and also to the bottom chamber $y_2$ through orifice 36 to provide feed back pressure.

Brake $B_0$ and its accumulator $B_0 A$ are connected also to bypass channel $y_5$ which is connected to port $y_3$ of sequence valve 67, and to the bottom chamber $y_4$ of valve 67 to provide feedback pressure. The feedback pressure on chamber $y_4$ is balanced with the spring 80 at top, which has been adjusted to the initial operating pressure at which the brake pads of the overdrive brake $B_0$ begin to contact one another. Therefore, the sequence valve 67 remains in the position shown at left to supply pressure to the overdrive brake $B_0$ through ports $Z_2$ and $y_3$ until the initial operating pressure is reached, whereas it is moved to the position shown at right to shut channels $z_2$ and $y_3$ when the initial operating pressure is exceeded.

Port z of control valve 66 is connected to port o of the third shift valve 53 through channel $z_1$ and orifice 36, the port o being connected to port $z_2$ of $B_0$ sequence valve 67 through bypass channel $z_5$, while channel $y_6$ diverted from channel $y_1$ is connected to channel $z_5$ through check valve 72.

Meanwhile, top chamber n of the third shift valve 53 is connected to solenoid valve $S_3$, while port l is connected to line pressure, and port q is connected to the overdrive direct clutch $C_0$ and its associated accumulator $C_0 A$ through channel $q_1$ and orifice 36. A check valve 75 is provided in parallel with the orifice 36 in channel $q_1$, allowing fluid expulsion from clutch $C_0$. A drain port is indicated d in the figures.

The selecting valve 90 has a spool 92 urged by spring 91, and is provided with bottom chamber $\alpha_1$ and middle chamber $\beta_1$ acting on spool to counteract the force of spring 91, and with ports $\alpha$ and $\beta$ leading to these chambers as well as other ports $\gamma$, $\delta$, $\epsilon$, $a_1$ and drain port d. Port $\alpha$ is connected to solenoid valve $S_D$ for $B_0$ control valve 66 through channel $t_3$, while port $\beta$ is connected to solenoid valve $S_3$ for the third shift valve 53 through port $n_2$. Port $a_1$ connects to port a of the manually operated selector valve 40 through channel $a_3$, port $\delta$ connects to the throttle pressure port $x_1$ of the electronically controlled throttle valve 41, port $\epsilon$ connects to forward clutch $C_1$ through channel $\epsilon_1$ and port $\gamma$ connects to the second coast brake $B_1$ and first speed and reverse brake $B_3$ through channel $\gamma_1$. The connection to brake $B_1$ is made through check valve 75 and orifice 36 by the double check valve 93 alternately switching over from the connection to a channel leading from the second coast modulator valve 56, while the connection to brake $B_3$ is made by the double check valve 93 alternately switching over from a channel leading to the first coast modulator valve 55 and the first shift valve 51.

The throttle valve 41 comprises an electronically controlled throttle valve controlled by a linear solenoid 42, and is controlled within a predetermined range by signals from a control unit E based on parameters such as the throttle setting and vehicle speed, to obtain appropriate throttle pressure.

As illustrated in FIG. 3, the cut-back valve 43 has the overdrive direct clutch $C_0$ connected to the top chamber on a spool pushed upward by a spring, and the second brake $B_2$ connected to the bottom chamber. Hence, when the main transmission unit 21 is in second speed or over (third speed or over for the transmission as a whole) where hydraulic pressure is applied to brake $B_2$, the cut-off valve 43 is in the position shown at left regardless whether the sub-transmission unit 16 is in overdrive or direct drive condition, and also when the main transmission unit 21 is in first speed in case the sub-transmission unit 16 is in overdrive condition (second speed for the transmission as a whole) where the overdrive direct clutch $C_0$ is disengaged, the cut-off valve 43 is in the position shown at left due to draining at the top chamber. Thus, the cut-off valve 43 supplies line pressure from port a of the manually operated selector valve 40 to the lock-up control valve 69 whenever the transmission as a whole is in second speed or over. The lock-up control valve 69 is hence capable of locking-up the torque converter even when the main transmission unit 21 is in first speed if the sub-transmission unit 16 is in overdrive condition, or whenever the transmission as a whole is in second speed or over, instead of being able to lock-up only when the main transmission unit 21 is in second speed or over as in prior art examples.

The second accumulator control valve 70 reduces the pressure supplied to the back pressure chambers 59, 60 and 61 of accumulators, $B_0 A$, $C_2 A$ and $B_2 A$ to maintain proper brake capacities when the main transmission unit 21 shifts up while the sub-transmission unit 16 is in overdrive condition, as the brake capacities in the main transmission unit becomes excessive compared to when the sub-transmission unit is in direct drive condition.

The operation of the present embodiment shall now be described.

Solenoid valves $S_1$, $S_2$, $S_3$, $S_L$, $S_D$, clutches $C_0$, $C_1$, $C_2$, brakes $B_0$, $B_1$, $B_3$ and one-way clutches $F_0$, $F_1$, $F_2$ are controlled according to the operation table shown in FIG. 4.

Figure 5:
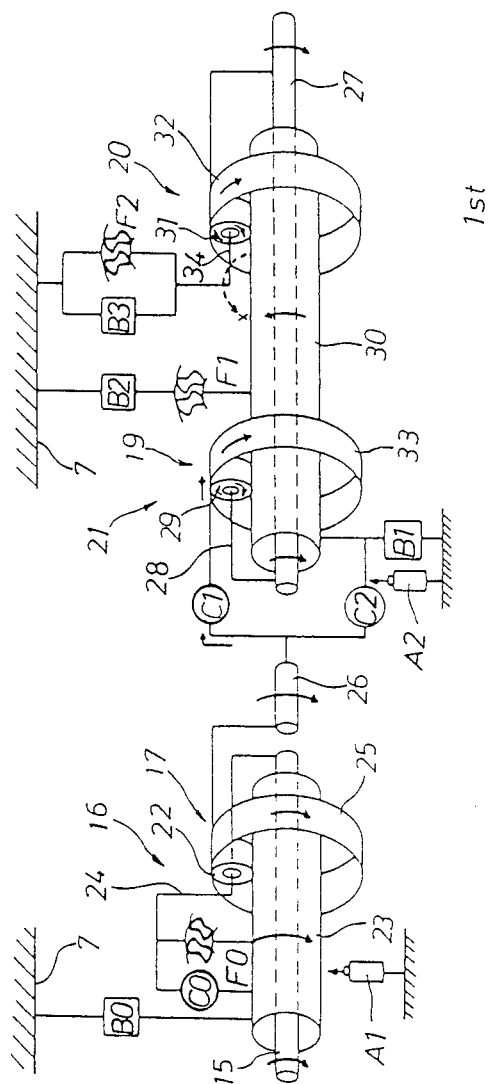

More precisely, as illustrated in FIG. 5, in first speed in D or S range, the overdrive direct clutch $C_0$, one-way clutch $F_0$, $F_2$ and forward clutch $C_1$ are engaged, while all remaining elements are disengaged or released. Hence, the sub-transmission unit 16 is in direct drive condition with the planetary gear unit 17 rotating in one piece due to engagement of clutch $C_0$ and one-way clutch $F_0$, directly transmitting the rotating of input shaft 15 to the input shaft 26 to main transmission unit 21. Meanwhile in the main transmission unit 21, the rotation of input shaft 26 is transmitted to ring gear 33 of the front planetary gear unit 19 and further to the carrier 28 and output shaft 27 integrated with the carrier, and also supplies leftward torque through sun gear 30 on carrier 34 of the rear planetary gear unit 20 whose rotation is prevented by the one-way clutch $F_2$, causing the planetary gears 31 instead to rotate and transmit power to the ring gear 32 fixed to output shaft 27. Hence the main transmission unit 21 is in first speed which, together with the sub-transmission unit 16 in direct drive condition, provides first speed for the transmission as a whole. During this process, power is divided and transmitted along two separate paths, one from the front planetary gear unit 19 to the output shaft 27, and the other through the rear planetary gear unit 20 to the output shaft 27, thus dispersing the load on gears.

In first speed, solenoid valves $S_3$ and $S_D$ are both deenergized, wherein the channel $n_2$ is in draining condition and channel $t_3$ is in applying condition. Under this condition, pressure fluid is fed to the bottom chamber $\alpha$ of selecting valve 90 through channel $t_3$ and port $\alpha_1$, placing the valve in the position shown at left ( 1 ), where the spool 92 is lifted against spring 91, connecting port $a_1$ with port $\epsilon$. Therefore, line pressure from port a of the manually operated valve 40 is supplied to the forward clutch $C_1$ through ports $a_1$ and $\epsilon$ and channel $\epsilon_1$, while port $\gamma$ leading to brakes $B_1$ and $B_3$ is connected to drain port d.

In second speed in D or R range, the overdrive brake $B_0$, one-way clutch $F_2$ and forward clutch $C_1$ are engaged while all other elements are disengaged, as illustrated in FIG. 6. Hence in the sub-transmission unit 16, sun gear 23 is locked by brake $B_0$ so that the planetary gears and the carrier are rotated to transmit power to ring gear 25, transmitting accelerated (overdrive) rotation to the input shaft 26 to main transmission unit 21. As the condition in the main transmission unit 21 is unaltered from first speed described above, the transmission as a whole produces second speed by combination of the main transmission unit 21 in first speed and the sub-transmission unit 16 in overdrive condition.

When shifting up to second speed, as indicated in FIG. 1, solenoid valve $S_3$ is energized, and line pressure is fed to top chamber n of the third shift valve 53 to move the valve spool to the position shown at left. Then, pressure fluid within clutch $C_0$ and its associated accumulator $C O_A$ is expelled from port q to drain port d, disengaging clutch $C_0$, while port 1 is connected to port o. The line pressure from port o is fed directly to overdrive brake $B_0$ through bypass channel $z_5$, ports $z_2$, $y_3$ of the sequence valve 67 and bypass channel $y_5$ until the initial operating pressure for $B_0$ piston is reached, whereas the valve 67 is moved to the position shown at right by feedback pressure in chamber $y_4$ once the initial operating pressure for $B_0$ piston is exceeded, whereafter the line pressure from port o is fed to port z of the $B_0$ release control valve 66 through orifice 36 and channel $z_1$. The control valve 66 is then in position shown at left where ports z and y are interconnected, supplying line pressure to brake $B_0$ and its associated accumulator $B_0$ A through channel $y_1$, to release brake $B_0$.

In second speed, solenoid valve $S_3$ is energized while solenoid valve $S_D$ is deenergized, wherein putting channels $n_2$ and $t_3$ are in applying condition, to supply pressure fluid to the bottom chamber $\alpha_1$ and middle chamber $\beta_1$ of the switching valve 90. Thus the spool 92 of selecting valve 90 is placed in the upper position shown at left ( 2 ), where line pressure in channel $a_3$ is fed to the forward clutch $C_1$ while port $\gamma$ leading to brakes $B_1$ and $B_3$ is connected to drain port d.

In third speed in D range, as illustrated in FIG. 7, the overdrive clutch $C_0$, one-way clutch $F_0$, forward clutch $C_1$, one-way clutch $F_1$ and brake $B_2$ are engaged while the others are disengaged. Thus the sub-transmission unit 16 is in direct drive condition as has been described before, transmitting the rotation of input shaft 15 directly to input shaft 26 to main transmission unit 21. In the main transmission unit 21, the rotation of input shaft 26 is transmitted through clutch $C_1$ to ring gear 33 of the front planetarary gear unit 19, providing sun gear 30 with a leftward torque through planetary gears 29, whereas the sun gear 30 is prevented from rotating by the action of one-way clutch $F_1$ accompanying the application of brake $B_3$. Hence the carrier rotates as planetary gears 29 rotates, transmitting rotation at second speed to the output shaft 27 through the front planetary gear unit 19 alone. Third speed is obtained as a result for the transmission as a whole, by combination of the sub-transmission unit 16 in direct drive condition and the main transmission unit 21 in second speed.

When shifting up to third speed, solenoid valve $S_D$ is energized to move the first shift valve 51 to the position shown on left in FIG. 3, connecting line pressure channel 1 to port j thus feeding line pressure to brake $B_2$ and its associated accumulator $B_2$ A. The resultant shifting condition of the main transmission unit 21, or the change in rotational speed of sun gear 30, is monitored by revolution sensor $A_2$, and the modulator pressure in channel t is reduced by duty control or on control of solenoid valve $S_D$ for $B_0$ release control in response to electrical signals from control unit E when the rotational speed begins to change. To be more precise, whereas the $S_D$ modulator valve 65 regulates the line pressure in line port l by spring 71 and the feedback pressure in its top chamber $S_1$ and supplies the regulated modulator pressure through channel t, the modulator pressure is reduced by duty control or on control of solenoid valve $S_D$, also reducing pressure in the top chamber $t_2$ of $B_0$ release control valve 66. Therefore, the control valve 66 is moved to the position shown at right in FIG. 1, while feedback pressure from brake $B_0$ is acting on its bottom chamber $y_2$, draining the pressure in brake $B_0$ and its associated accumulator $B_0 A$ through channel $y_1$ and port y to drain port d.

The decrease in rotational speed of sun gear 30 due to application of brake $B_2$ is detected by revolution sensor $A_2$ in the main transmission unit 21, while the increase in rotational speed due to releasing of brake $B_0$ is detected by revolution sensor $A_1$ in the sub-transmission unit 16. The signals from control unit E based on outputs from sensors $A_1$ and $A_2$ control solenoid valve $S_D$ which in turn controls the release pressure for the overdrive brake $B_0$, to synchronize the releasing of brake $B_0$ with the application of brake $B_2$. If solenoid valve $S_D$ is subject to control, appropriate throttle pressure from the electronically controlled throttle valve 41 is fed to port x of control valve 66, reducing pressure in the control valve 66 in fine increments similar to duty control. When the releasing operation of brake $B_0$ and the applying operation of brake $B_2$ are synchronised, the completion of shifting operation, i.e. stop of rotation of the sun gear 30, is detected by revolution sensor $A_2$, upon which solenoid valve $S_3$ is deenergized and the third shift valve 53 is moved to the position shown at right in figure 1. Line pressure port l is then connected to port q to feed line pressure to clutch $C_0$ and its associated accumulator $C_0 A$ through channel $q_1$ to engage clutch $C_0$, while port o is connected to drain port d to swiftly and completely drain pressure in the overdrive brake $B_0$ through channel $y_6$, check valve 72, channel $z_5$, and port o, to complete the shifting operation of sub-transmission 16. The main transmission unit 21 and the sub-transmission unit 16 are thus smoothly shifted in synchronism.

In case solenoid valve $S_D$ malfunctions, and $B_0$ release control valve 66 is also stuck in the position shown at left in FIG. 1 with port y disconnected from drain port d, the pressure fluid within brake $B_0$ is sent to channel $z_5$ through ports y and z, and to channel $z_1$ through check valve 72 which is opened when draining, and further to the third shift valve 53 which is in the position shown at right in FIG. 3 when solenoid valve $S_3$ is deenergized, to be expelled through drain port d from port o. Thus, even when the valves malfunction, line pressure is fed to both overdrive brake $B_0$ and clutch $C_0$, preventing the overdrive planetary gear unit 17 from locking, to ensure safe operation.

During the shifting process from second to third speed, solenoid valve $S_D$ and $S_3$ are both energized, wherein the channel $n_2$ is in applying condition and channel t is in draining condition. Under this condition, bottom chamber $\alpha_1$ of the selecting valve 90 is drained while the middle chamber $\beta_1$ is fed with pressure fluid, lifting the spool 92 against spring 91 into the position shown at left ( 3 ). Hence, line pressure is fed to forward clutch $C_1$ through ports $a_1$ and $\alpha$, while port $\gamma$ leading to brakes B 1 and B 3 is drained.

Once third speed is attained, solenoid valve $S_3$ is deenergized, so that pressure fluid is supplied to bottom chamber $\alpha_1$ while middle chamber $\beta_1$ is drained, as was the case in first speed. The selecting valve 90 is therefore similarly in the position shown at left.

Figure 8:
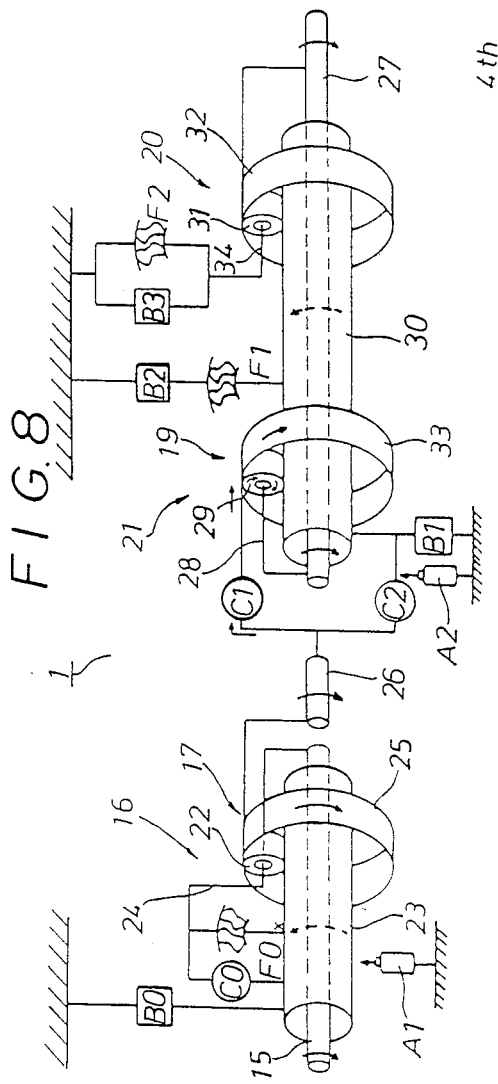

In fourth speed in D range, the overdrive brake $B_0$, forward clutch $C_1$, brake $B_2$ and one-way clutch $F_1$ are engaged, while the others are disengaged, as illustrated in FIG. 8. Hence, the sub-transmission unit 16 is in overdrive condition and the main transmission unit 21 is in second speed, resulting in fourth speed for the transmission as a whole.

In fourth speed, solenoid valve $S_3$ is energized while solenoid valve $S_D$ is deenergized in the same manner as for second speed, with the selecting valve 90 in the position shown at left.

Figure 9:
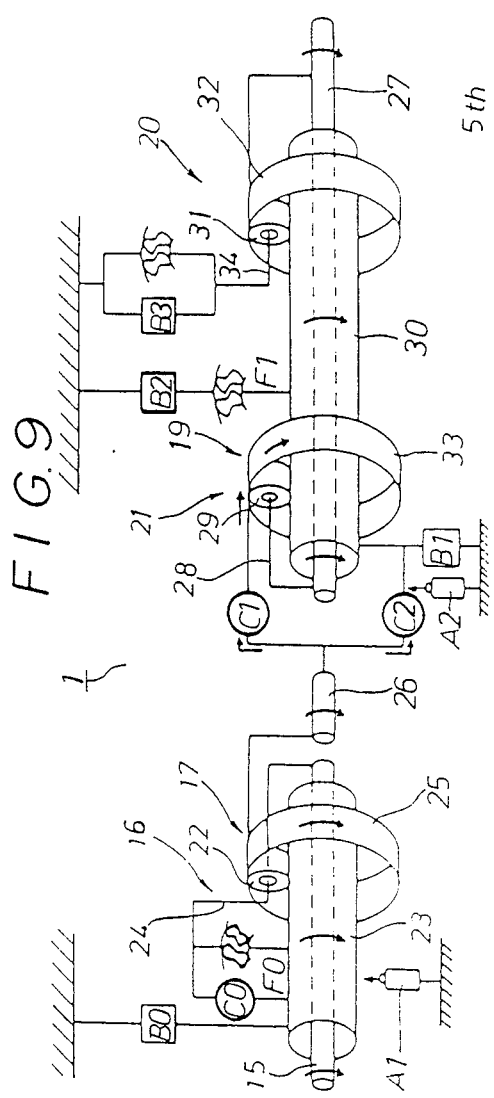

In fifth speed in D range, as illustrated in FIG. 9 the overdrive clutch $C_0$, one-way clutch $F_0$, forward clutch $C_1$, direct clutch $C_2$ and brake $B_2$ are engaged while the others are disengaged. Hence, the sub-transmission unit 16 is in direct drive condition as has been described before, while in the main transmission unit 21, the front planetary gear unit 19 is rotated in one piece due to clutches $C_1$ and $C_2$ engaging and transmitting the rotation of input shaft 26 directly to output shaft 27. As a result, the direct drive condition of the sub-transmission unit 16 and the third speed condition in the main transmission unit 21 are combined to produce fifth speed for the transmission as a whole, where the input shaft 15 and the output shaft 27 are rotated in unison.

Similar to the case of transition from second to third speed described before, the shifting condition of main transmission unit 21, or the rotational speed of sun gear 30, is monitored by revolution sensor $A_2$, so that $B_0$ release control valve 66 is controlled by means of solenoid valve $S_D$ by signals from control unit E based on input from sensor $A_2$, to control the releasing of overdrive brake $B_0$. Solenoid valve $S_D$ may be controlled by signals from both sensors $A_1$ and $A_2$ to regulate the pressure in brake $B_0$ in order to synchronize the shifting down of sub-transmission unit 16 with the shifting up of main transmission unit 21, and eventually deenergized to complete a smooth shifting operation.

In fifth speed, solenoid valves $S_D$ and $S_3$ are both deenergized, with the selecting valve 90 in the position shown at left, as in first and third speeds.

In sixth speed in D range, the overdrive brake $B_0$, forward clutch $C_1$, direct clutch $C_2$ and brake $B_2$ are engaged while the others are disengaged, as illustrated in FIG. 10. Hence, the sub-transmission unit 16 is in overdrive condition as described before, while the main transmissiom unit 21 is in third speed condition described above, resulting in sixth speed for the combined transmission 1.

In sixth speed also, solenoid valve $S_3$ is energized while solenoid valve $S_D$ is deenergized, with the selecting valve 90 in the position shown at left.

In R range, as illustrated in FIG. 11, the overdrive clutch $C_0$, one-way clutch $F_0$, direct clutch $C_2$ and brake $B_3$ are engaged while the other elements are disengaged. Hence, the sub-transmission unit 16 is in direct drive condition, while in the main transmission unit 21, the rotation of input shaft 26 is transmitted directly to sun gear 30 through clutch $C_2$, the rotation being transmitted to ring gear 32 in reverse direction through rotation of planetary gears 31, as carrier 34 of the rear planetary gear unit is locked against rotation by brake $B_3$, thus turning the output shaft 27 in reverse direction.

Solenoid valves $S_D$ and $S_3$ are both deenergized, with the selecting valve 90 in the position shown at left as for first, third and fifth speeds described before, where ports $a_1$ and $\epsilon$ are interconnected, whereas the manually operated selector valve 40 is in R position where port a is drained. Therefore no pressure is fed to forward clutch $C_1$, while port $\gamma$ leading to brakes $B_1$ $B_3$ is drained.

In third and fourth speeds in S or L range, the second coast brake $B_1$ is applied in addition to the elements engaged in third and fourth speeds in D range described before, enabling application of engine brake by preventing rotation of sun gear 30 in either direction. During transition from second to third speed, solenoid valve $S_D$ is controlled as in D range to shift the sub-and main transmission units in synchronization.

In first and second speeds in L range, the first speed and reverse brake $B_3$ is applied in addition to the elements engaged in first and second speeds in D range. Hence, application of engine brake is enabled by preventing the carrier 34 of rear planetary gear unit 31 from rotating in either direction.

In D, S and L ranges described above, when the vehicle is stopped for reasons such as traffic lights, the control unit E would send out an energizing signal to solenoid valve $S_D$, based on stop signal such as the zero signal from a vehicle speed sensor. Channels $t_1$ and $t_3$ are then twined draining condition to drain fluid in the bottom chamber $\alpha_1$ through port $\alpha$, and solenoid valve $S_3$ for controlling the third shift valve 53 is deenergized. Because middle chamber $\beta_1$ is drained through channel $n_2$ and port $\beta$, the selecting valve 90 is moved to the position shown at right ( 4 ) where spool 92 is lowered by spring 91, disconnecting port $\gamma$ and port $\epsilon$ from drain port d and $a_1$, and connecting them instead to ports $a_1$ and $\delta$ respectively. Line pressure in channel $a_3$ is hence connected to the second coast brake $B_1$ through ports $a_1$ and $\gamma$, channel $\gamma_1$, double check valve 93 and orifice 36 to apply brake $B_1$, and at the same time connected to the first speed and reverse brake $B_3$ through double check valve 93 to apply brake $B_3$.

Meanwhile, throttle pressure from the electronically controlled throttle valve 41 is supplied to forward clutch $C_1$ through channel $\delta_1$, ports $\delta$ and $\epsilon$, and channel $\epsilon_1$ to disengage clutch $C_1$. Thus, the rotation of input shaft 26 due to the tractive torque generated by torque converter 2 is isolated and is not transmitted to output shaft 27, preventing the vehicle from creeping forward, while at the same time the rear planetary gear unit is locked by application of brakes $B_1$ and $B_3$ to prevent the vehicle from rolling on grades.

During this process, the linear solenoid valve 42 for controlling throttle valve 41 adjusts the throttle pressure according to signals from control unit E to a value just before engaging forward clutch $C_1$ and transmitting torque. To be more specific, an appropriate throttle pressure is obtained by controlling linear solenoid 42 according to signals from revolution sensor $A_1$ monitoring the rotation of sun gear 23 of the overdrive planetary gear unit 17, to avoid the rotation of sun gear 23 from becoming zero.

When a starting signal, such as the throttle setting, is sent while the vehicle is at standstill, the control unit E sends a signal to deenergize solenoid valve $S_D$. Channel $t_3$ is then put in applying condition supplying pressure fluid to bottom chamber $\alpha_1$ of the selecting valve 90, and moving the valve 90 to the position shown at left. This condition is similar to the running condition in first to sixth speeds described before, where port a 1 is connected to port $\epsilon$ to supply line pressure in channel $a_3$ to forward clutch $C_1$, port $\gamma$ is connected to drain port d shutting off channel $\gamma_1$ leading to double check valve 93 for brakes $B_1$ and $B_3$, and throttle pressure port $\delta$ is closed.

Whereas the second coast brake $B_1$ and the first speed and reverse brake $B_3$ were both applied in the embodiment described above to prevent the vehicle from rolling in both forward and rearward directions, needless to say, the second coast brake alone may be applied to prevent vehicle motion in rearward direction only.

Also, it should be obvious that if the hill-holding function is not required, ports $\gamma$ and d may be closed or omitted, severing the fluid flow to brakes $B_1$ and $B_3$ through channel $\gamma_1$.

Whereas the operation of selecting valve 90 has been controlled in the embodiment described above by solenoid valve $S_3$ for the third shift valve 53 and solenoid valve $S_D$ for $B_0$ release control valve 66, other valves, or a special valve controlled by the control unit E may also be used. Also, although an example of the invention applied to a multiple speed automatic transmission comprising a combination of an overdrive planetary gear unit with two planetary gear units has been described, needless to say, the type of transmission need not be restricted, and the invention may also be applied in similar manner to any kind of automatic transmission incorporating hydraulic servos, such as a multiple speed automatic transmission comprising a combination of an underdrive (U/D) planetary gear unit with two planetary gear units, a four speed split-type automatic transmission comprising two planetary gear units separated by clutch, a four speed automatic transmission comprising two planetary gear units of the type other than split-type, a multiple speed automatic transmission comprising a combination of such four speed automatic transmission with an overdrive or underdrive planetary gear unit, or even a common three speed automatic transmission.

The benefits attained by the embodiments of the present invention may be summarized as follows:

As the forward clutch is disengaged when the vehicle is stopped, no load is exerted on the engine during stop resulting in improved fuel economy, while positively preventing the vehicle from creeping forward. At the same time, the control apparatus can remain compact and simple by the use of an electronically operated regulating valve 41, which also prevents lag in response at start, by applying a throttle pressure just before engaging forward clutch $C_1$ while the vehicle is stopped.

The vehicle can be hill-held, as brake $B_1$ (or $B_1$ and $B_3$) which restricts vehicle movement, is applied while the vehicle is stopped.

By using an electronically controlled throttle valve for the electronically operated regulating valve, no special valve other than the selecting valve 90 is required, resulting in improved reliability and avoiding cost increase.

In control during vehicle start, the throttle valve 41 is controlled to gradually increase throttle pressure to engage the forward cluch $C_1$ without shift shock, whereafter the selecting valve 90 is switched to provide line pressure to forward clutch $C_1$, thus preventing shift shock when starting in D (or S or L) range and enabling smooth starts.

Also, by supplying line pressure to the selecting valve 90 through the port a which connects to line pressure in D (S, L) range, as well as controlling the throttle pressure by the throttle valve, shifting from N range to D (or S or L) range can also be made smoothly without lag in response or shift shock.

The electronically controlled throttle valve can be positively adjusted with ease to provide a pressure just before engaging the forward clutch by signals from a revolution sensor, if the transmission gear mechanism 3 produces multiple speeds by combining a sub-transmission unit 16 with a main transmission unit 21, equipped with revolution sensor $A_1$ (and/or $A_2$) for synchronizing the shifting of the two units.

The construction of the control device can be even more simplified, by controlling the selecting valve 90 with a combination of solenoid valves which are inactive at low speeds, such as solenoid valve $S_D$ for controlling the $B_0$ release control valve 66 and solenoid valve $S_3$ for controlling the third shift valve 53, thus eliminating the need for any special valve to control the selecting valve 90.

The vehicle can be prevented from rolling backward with an extremely simple construction, by using a first (second coast) brake $B_1$ for arresting sun gear 30 as the brake for restricting vehicle movement.

The vehicle can be prevented from rolling forward as well as backward, by using a first (second coast) brake $B_1$ for arresting sun gear 30, and a third (first speed and reverse) brake $B_3$ for arresting carrier 34 of the rear planetary gear unit 20 as the brakes for restricting vehicle movement.

What is claimed is:

1. A hydraulic control device for an automatic transmission, including a control unit, a shift gear mechanism, clutches and brakes for controlling the shift gear mechanism, hydraulic servos for actuating the clutches and brakes to control the shift gear mechanism and having hydraulic servo for a forward clutch, and an electronically operated regulating valve for regulating pressure according to signals from the control unit, comprising:

a selecting valve switched by signals indicating stopping and running condition of a vehicle, said selecting valve being connected to the hydraulic servo for the forward clutch for engaging and transmitting torque during the forward running condition, said selecting valve selectively receiving a line pressure and a control pressure from said regulating valve so that hydraulic pressure just below engaging pressure regulated by said regulating valve is applied to said hydraulic servo for the forward clutch during stopping, and a line pressure is applied to said hydraulic servo for the forward clutch during running.

2. A hydraulic control device for automatic transmission of claim 1, wherein said hydraulic servos includes a hydraulic servo for a brake, and said selecting valve is provided with a port connected to the hydraulic servo for the brake to hold the vehicle so that said control pressure appropriately regulated by said regulating valve is applied to said hydraulic servo for the forward clutch and said line pressure is applied to said hydraulic servo for said brake during stopping, and said line pressure is applied to said hydraulic servo for the forward clutch and said hydraulic servo for the brake is drained when running.

3. A hydraulic control device for an automatic transmission of claim 2, wherein said electronically operated regulating valve is an electronically controlled throttle valve, and said control pressure is a throttle pressure.

4. A hydraulic control device for an automatic transmission of claim 3, wherein said shift gear mechanism so that a multiple speed transmission is obtained by combination of these transmission units by controlling said clutches and said brakes, said control unit having a revolution sensor detecting rotational speed of a certain element in said transmission units so that said control unit controls said electronically operated throttle valve according to signals from said revolution sensor, said control unit regulating said electronically operated throttle valve so that said throttle valve has a required throttle pressure.

5. A hydraulic control device for an automatic transmission of claim 3, further comprising shift valves and solenoid valves, fluid for said hydraulic servos for said clutches and brakes being regulated by the shift valves controlled by the solenoid valves, and switching of said selecting valve being controlled by combination of said solenoid valves, at least one solenoid valve being under fluid applying condition during running and at least one solenoid valve being unused during running at a low speed.

6. A hydraulic control device for an automatic transmission of claim 3, further comprising shift valve and solenoid valves, and said shift gear mechanism comprising an overdrive planetary gear unit, a front planetary gear unit and a rear planetary gear unit so that switching of said selecting valve is controlled by one of the solenoid valves controlling the shift valve for shifting said overdrive planetary gear unit, and the other solenoid valve controlling brake releasing pressure for said overdrive planetary gear unit.

7. A hydraulic control device for an automatic transmission of claim 2, further comprising a manual valve having a port communicating the selecting valve and a line pressure port, said line pressure applied to said selecting valve being transmitted through the port of the manual valve communicating the selecting valve and the line pressure port of said manual valve during forward operation of said manual valve.

8. A hydraulic control device for an automatic transmission of claim 2, wherein said shift gear mechanism comprises a direct clutch, two single planetary gear units having sun gears interconnected together, two carriers and two ring gears, one carrier of one of said gear units being connected to one ring gear of the other of said gear units for constituting an output member, and an input member connected to the ring gear of said one of the gear units through said forward clutch and to said sun gears through the direct clutch, said clutches and brakes for the shift mechanism comprising first, second and third brakes and a first one-way clutch, said sun gears being arrested by the first brake and by the second brake through the first one-way clutch, while the carrier of another of the gear units is arrested by the third brake, vehicle movement being restricted by said first brake.

9. A hydraulic control device for an automatic transmission of claim 2, wherein said shift gear mechanism comprises a direct clutch, two single planetary gear units having sun gears interconnected together, two carriers and two ring gears, one carrier of one of said gear units being connected to one ring gear of the other of said gear units constituting an output member, and an input member connected to said ring gear of said one of said gear units through said forward clutch and to said sun gears through the direct clutch, said clutches and brakes for the shift mechanism comprising first, second and third brakes and a first one-way clutch, said sun gears being arrested by the first brake and by the second brake through the first one-way clutch, while the carrier of another of gear units is arrested by the third brake, vehicle movement being restricted by said first and third brakes.

10. A hydraulic control device for an automatic transmission of claim 1, wherein said electronically operated regulating valve is an electronically controlled throttle valve, and said control pressure is a throttle pressure.

11. A hydraulic control device for an automatic transmission of claim 10, wherein said shift gear mechanism comprises a sub-transmission unit and a main transmission unit so that a multiple speed transmission is obtained by combination of these transmission units by controlling said clutches and said brakes, said control unit having a revolution sensor detecting rotational speed of a certain element in said transmission units so that said control unit controls said electronically operated throttle valve according to signals from said revolution sensor, said control unit regulating said electronically operated throttle valve so that said throttle valve has a required throttle pressure.

12. A hydraulic control device for an automatic transmission of claim 10, further comprising shift valves and solenoid valves, fluid for said hydraulic servos for said clutches and brakes being regulated by the shift valves controlled by the solenoid valves, and switching of said selecting valve being controlled by combination of said solenoid valves, at least one solenoid valve being under fluid applying condition during running and at least one solenoid valve being unused during running at a low speed.

13. A hydraulic control device for an automatic transmission of claim 10, further comprising shift valve and solenoid valves, and said shift gear mechanism comprising an overdrive planetary gear unit, a front planetary gear unit and a rear planetary gear unit so that shifting of said selecting valve is controlled by one of the solenoid valves controlling the shift valve for switching said overdrive planetary gear unit, and the other solenoid valve controlling brake releasing pressure for said overdrive planetary gear unit.

14. A hydraulic control device for an automatic transmission of claim 1, wherein when said selecting valve switches from the control pressure to the line pressure to apply to said hydraulic servo for the forward clutch, said electronically operated regulating valve is controlled to gradually increase said control pressure until said forward clutch is smoothly engaged, after that said selecting valve is switched to apply line pressure to said hydraulic servo for the forward clutch.

15. A hydraulic control device for an automatic transmission of claim 1, further comprising a manual valve having a port communicating the selecting valve and a line pressure port; said line pressure applied to said selecting valve being transmitted through the port of the manual valve communicating the selecting valve and the line pressure port of said manual valve during forward operation of said manual valve.

* * * * *